United States Patent [19]
Brunner et al.

[11] Patent Number: 4,782,918
[45] Date of Patent: Nov. 8, 1988

[54] PORTABLE COLLAPSIBLE TREE STAND

[76] Inventors: Paul B. Brunner; Karen L. T. Brunner, both of Box 10, Ovando, Mont. 59854

[21] Appl. No.: 931,677

[22] Filed: Nov. 17, 1986

[51] Int. Cl.$^4$ .............................. A45F 3/26; A47C 9/10
[52] U.S. Cl. ..................................... 182/187; 108/152
[58] Field of Search ................ 182/187, 188; 108/152

[56] References Cited

U.S. PATENT DOCUMENTS

| | | | |
|---|---|---|---|
| 1,409,559 | 3/1922 | McLeod | 182/130 |
| 2,855,980 | 10/1958 | Konieczka | 182/187 |
| 3,493,080 | 2/1970 | Ehlert | 182/187 |
| 4,120,379 | 10/1978 | Carter | 182/187 |
| 4,129,198 | 12/1978 | Hunter | 182/187 |
| 4,236,602 | 12/1980 | Leggett | 182/187 |
| 4,369,858 | 1/1983 | Babb | 182/187 |
| 4,411,335 | 10/1983 | Forrester | 182/187 |
| 4,549,635 | 10/1985 | Early | 182/187 |
| 4,552,246 | 11/1985 | Thomas | 182/187 |

*Primary Examiner*—Reinaldo P. Machado
*Attorney, Agent, or Firm*—Wells, St. John & Roberts

[57] ABSTRACT

A tree stand for supporting a hunter, outdoorsman, cameraman or the like at an elevated position upon a tree trunk. The stand includes tree-engaging extensions which support a longitudinal subframe spaced from the tree. Mounting extensions are provided for a platform and seat. The platform and seat are independently pivotal between extended and retracted positions. In the retracted positions the seat and platform are over top dead center to be gravity biased against the stationary framework.

19 Claims, 4 Drawing Sheets

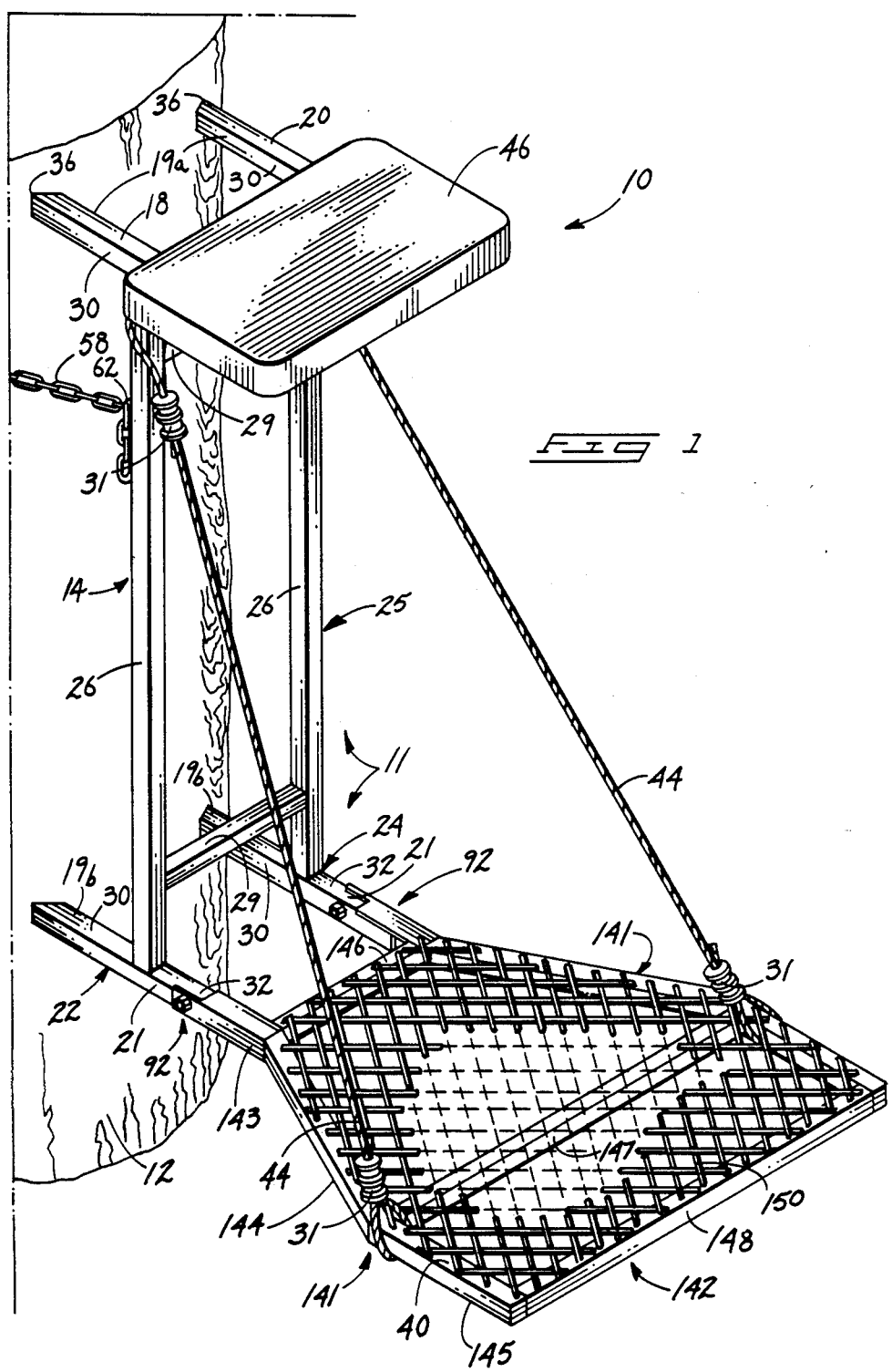

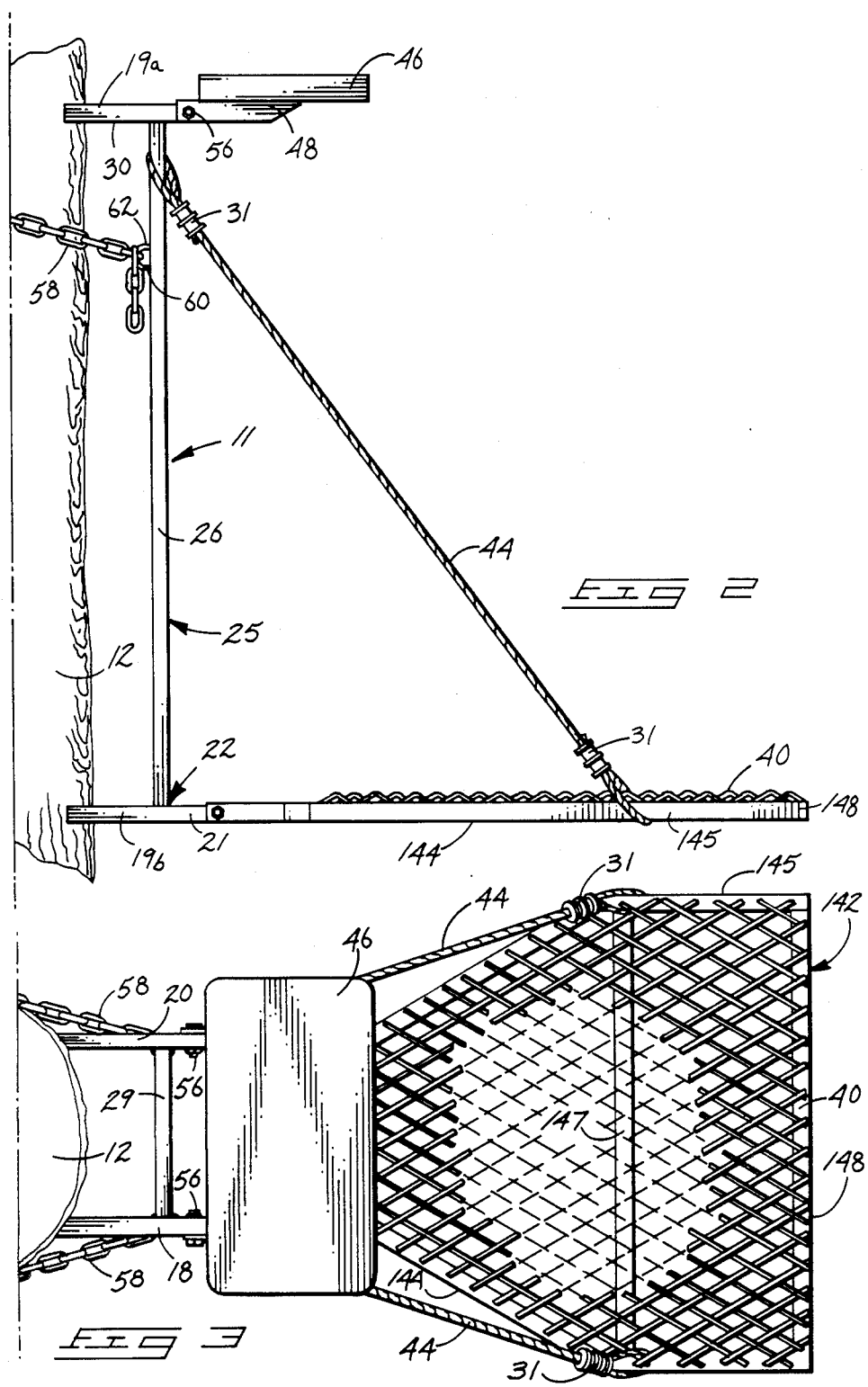

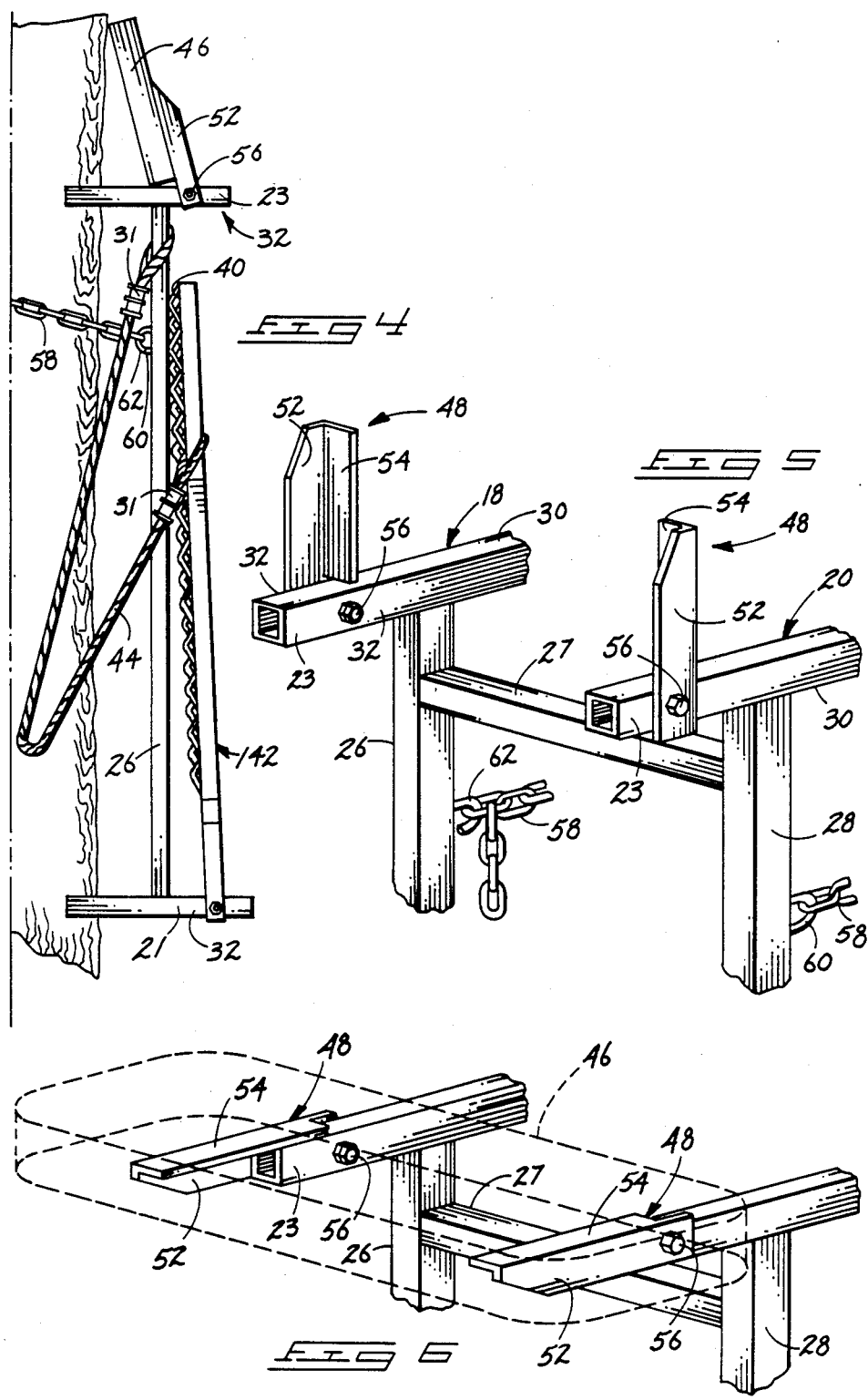

PORTABLE COLLAPSIBLE TREE STAND

TECHNICAL FIELD

This invention relates generally to tree-mountable stands for supporting hunters, outdoorsmen, bird watchers, cameramen and others at an elevated position upon a tree trunk.

BACKGROUND OF THE INVENTION

Hunters have for years used tree mounted stands for certain types of hunting, such as deer and elk hunting. For example, U.S. Pat. No. 4,120,379 to Carter discloses a tree stand having a frame with two elongate frame members which lay directly against the side of a tree. A flexible cable extends around the tree and attaches at the top of the frame. A lower platform extends outwardly from the bottom of the frame providing a support upon which a hunter can stand. A seat extends outwardly from the frame near the top. The seat and platform are pivotally mounted to the frame allowing collapse of the frame for transport. The seat and platform are maintained in horizontal positions by suspension cables. Knife-like prongs are included at the bottom of the frame but not at the top. The Carter stand is disadvantaged by the direct bearing of the two longitudinal frame members upon the tree which substantially decreases stability of the frame due to irregularities in the tree surface. The Carter stand is further disadvantageous because the seat and platform cannot be folded up into a self-biasing retracted position after the stand has been hung in a tree. This causes snow and debris to build up when the stand is left in a tree.

U.S. Pat. No. 4,552,246 to Thomas discloses another foldable tree stand having a ring-like member which extends from the seat and encircles the tree trunk securing the stand thereto. A stanchion functioning as a ladder extends from the stand to the ground, providing additional support to the elevated stand. The Thomas stand is disadvantaged in that the seat and platform are not pivotal into retracted positions while the stand is mounted to a tree. The stanchion also limits the range of heights to which the unit can be employed.

U.S. Pat. No. 4,411,335 to Forrester discloses another tree stand having a horizontally oriented foot platform and seat. The tree stand is secured to a trunk by means of two chains which extend around the trunk and connect to upper and lower portions of the frame. Four spikes project from the frame and engage the tree. The tree is only engaged by horizontal members and the spikes thus causing instability. The platform and seat are not collapsible with respect to the frame.

U.S. Pat. No. 4,369,858 to Babb discloses a generally triangularly shaped tree stand having a horizontal foot platform and seat. An upper frame member extends angularly upward from the outer edge of the platform and is connected around the back side of the tree. A notched inner side of the platform frictionally engages the front side of the tree at a lower elevation and cooperates with the upper portion of the frame to support the stand on the tree. The seat and platform are not capable of being retracted while the stand is mounted to a tree, thus suffering the problems of snow and debris accumulations. The Babb stand also provides a very limited size of seat and platform and little vertical height for the seat thus placing strain on the user's knees.

U.S. Pat. No. 4,549,635 to Early discloses another tree stand, having a rigid U-shaped foot-resting frame and an upwardly extending seat support member pivotally connected thereto. A tree engaging support member angles upwardly from the U-shaped frame and is connected in a scissors arrangement with a seat support member. The two members are provided with special pieces for engaging the trunk of a tree at two vertically spaced points. The stand is secured to the tree by means of two ropes or cables which encircle the tree trunk at the upper and lower ends of the stand framework. The seat and platform are not retractable while the stand is mounted in a tree. The Early stand is also susceptible to lateral instability because of the two relatively narrow, vertically arranged points of contact.

Despite the numerous styles and constructions of tree stands shown in the art, none provide the high degree of stability needed for hunting and photography and desired by most other users. Stability is critical in such applications because even minute movements of the hunter or photographer in preparation of shooting will cause movement of the stand relative to the tree. Such movement of the stand will crunch the bark or otherwise cause noise alerting the prey or photographic subject to the hunter or photographer's presence thereby causing lost shots.

The prior art is further deficient in providing a tree stand which allows the platform and seat to be independently retracted while the stand is mounted in a tree. The prior art also does not show retractable platforms or seat constructions which are self-biasing into a nearly vertical over-center positions to prevent buildup of snow and debris during non-use but continued mounting in a tree.

DETAILED DESCRIPTION OF THE DRAWINGS

Preferred embodiments of the invention are illustrated in the accompanying drawings, in which:

FIG. 1 is a perspective view of a tree stand according to the invention shown mounted to a tree trunk;

FIG. 2 is a side elevational view of the tree stand shown in FIG. 1;

FIG. 3 is a top view of the stand and tree shown in FIG. 1;

FIG. 4 is a side elevational view of the tree stand and tree of FIG. 1, shown with the seat and platform pivoted into upstanding retracted positions;

FIG. 5 is an enlarged perspective view of pivotal mounts for the seat shown in FIG. 1; the mounts are shown in retracted positions; the seat has been removed for clarity of view;

FIG. 6 is an enlarged perspective view similar to FIG. 5 with the pivotal mounts shown in extended positions; the seat is shown in phantom.

DETAILED DESCRIPTION OF THE PREFERRED EMBODIMENT

Figure 7:
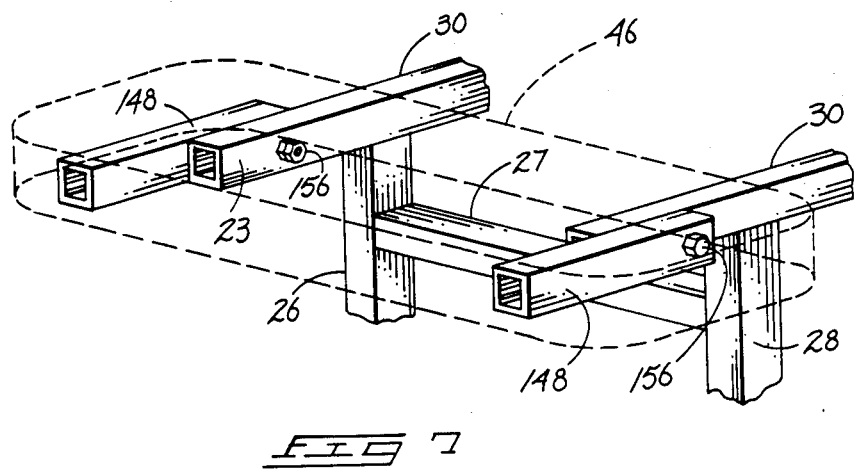
FIG. 7 is an enlarged perspective view of alternative embodiment pivot mounts for the seat shown in FIG. 1.

The following disclosure of the invention is submitted in compliance with the constitutional purpose of the Patent Laws "to promote the progress of science and useful arts" (Article 1, Section 8).

FIGS. 1–3 show a tree stand 10 in accordance with the invention mounted to a tree 12. Stand 10 is adapted for supporting a hunter, photographer, outdoorsman, observer or the like at any desired elevated position upon tree 12.

Stand 10 includes a stationary framework 11. A platform 40 is pivotally attached to lower portions of the stationary framework 11 to allow a user to stand and rest his feet upon the platform. Stand 10 also includes a seat 46 pivotally connected to upper portions of stationary framework 11 upon which a person can sit. The seat and platform are each mounted for independent pivotal motion between extended and retracted positions. The pivotal mountings allow the stand to be collapsed for portability and allow retraction to prevent the stand from collecting falling snow and debris when installed and left unattended. The independent operation allows the seat to be retracted when not desired in use.

Stationary framework 11 includes an elongated longitudinal subframe 25. Longitudinal subframe 25 can be constructed of a single member or more preferably from two or more elongated longitudinal members 26. A preferred form of longitudinal subframe 25 uses two parallel vertically mounted longitudinal members or elements 26. longitudinal subframe 25 further advantageously includes horizontally mounted interconnecting braces or struts 29 which preferably extend between vertical longitudinal members 26 to rigidly space and connect such members into an integrated longitudinal subframe. Other single or multiple component longitudinal subframe structures are also clearly possible.

Stationary framework 11 further includes a plurality of transversely mounted, tree-engaging extensions 19. Tree-engaging extensions 19 include upper extensions 19a and lower extensions 19b. Extensions 19 are advantageously formed by a first or treeward extensions of horizontally mounted transverse members 18, 20, 22, and 24. Second or outwardly extending portions 32 of transverse members 18, 20, 22, and 24 serve to mount platform 40 and seat 46 as will be explained more fully hereinafter.

Tree-engaging extensions 19 are sufficiently long so as to clearly space the longitudinal subframe 25 away from tree 12. Point contact at the ends of the four tree-engaging extensions provide greatly increased stability for stand 10. It has been found preferably to provide horizontal spacing between extensions 19 of approximately 4 inches (10 cm) or greater. Horizontal spacings of less than 3 inches (7.6 cm) have been found unsatisfactory for achieving desired stability. The upper and lower tree-engaging extensions 19a and 19b are preferably spaced approximately 26 inches (66 cm) to allow a relaxing and comfortable extension of the user's legs when seated.

Tree-engaging extensions 19 are preferably provided with angled or otherwise sharpened or pointed ends or tips 36. Preferred tips are angled at approximately 45° with the extreme tip end being toward the outside of the stand to better conform to the tree's shape and increase the effective width for better stability.

The stationary frame 11 further includes platform mounting extensions 21. Extensions 21 are advantageously formed by the second or outwardly extending portions 32 of lower transverse members 22 and 24. The platform mounting extensions are adapted to include platform pivots 92. Platform pivots 92 are advantageously constructed similar to the seat pivot constructions explained more fully below, although such constructions are not mandatory. Pivots 92 are spaced outwardly from the outward surfaces of longitudinal subframe 25 so that platform 40 passes over top dead center when positioned into the retracted position shown in FIG. 4. This causes platform 40 to lean into the stationary framework thus gravity biasing the platform into the retracted position.

Stationary framework 11 also advantageously includes seat mounting extensions 23. Seat mounting extensions 23 (see FIGS. 5 and 6) which are advantageously formed by second or outwardly extending portions 32 of horizontal members 18 and 20. Extension 23 are preferably adapted to allow pivotal mounting of seat 46 at pivots 56.

The horizontal members 18 and 22 form an I-shaped member with longitudinal element 26. Similarly, horizontal members 20 and 24 form an I-shaped member with the other longitudinal member 26. This preferred construction for framework 11 provides rigidity and is economical to construct.

Platform 40 is preferably planar and includes a platform framework 142 with side pieces 141 extending along each side thereof. Side pieces 141 advantageously include pivot connection portions 143 for connecting to pivots 92. Platform side pieces 141 are also advantageously constructed with diverging angled portions 144 which increase the width of the platform while providing smooth structural continuity without step-like changes in width which produce increased torsional loading. Side pieces 141 are further provided with distal portions 145 which are advantageously parallel.

Platform framework 142 further includes first, second and third transverse brackets 146, 147, and 148 which extend between side pieces 141 at the juncture of portions 143 to 144, 144 to 145, and at the distal extreme of platofrm 40. Such braces and the side pieces are advantageously connected in an integral manner by welding or other forming techniques to provide good structural rigidity. The extension or length of the platform is less than the available height between the extensions 21 and 23 so that the platform can be retracted independently of the seat position.

Platform 40 also includes a platform deck 150 which is supported by the platform framework. Deck 150 supports the hunter or other user and adds structural strength to platform frame 142. Deck 150 is preferably made from reticulated material such as expanded metal, mesh or the like. Construction with such reticulated materials prevents snow buildup during actual use in snowstorms. Snow buildup on platforms causes squeeking to occur when the hunter moves, thus increasing the risks of inadvertently scaring the prey.

Platform 40 is supported by a platform support means such as a pair of flexible suspension cables 44. Cables 44 extend from stationary framework 25 to connect at outer portions of the platform. The upper ends of suspension cables 44 are preferably looped or otherwise arranged about the vertical members 26 and 28 above brace 27 which retains the cables upwardly. Clamps 31 serve to fix the cable into loops. The lower ends of suspension cables 44 are advantageously looped about the side pieces 141 outwardly from second brace 147. Side brace 147 thus fixes the looped lower ends of cables 44 against inward movement along the side pieces 141 of the platform frame. The platform support cables serve to limit downward pivotal motion of the platform and secure it in a substantially horizontal orientation when in the extended position. Cables 44 easily bend to allow pivoting of platform 40 into upstanding positions such as the retracted position of FIG. 4. Other types of flexible suspension members are alternatively possible.

Seat 46 is preferably planar and can be constructed of plywood, plastic or other suitable materials. Seats used on the stands of this invention can be provided with a foam pad on the upper surface (not shown) to better insulate against the cold.

Seat 46 is preferably connected to a pair of seat support members 48 which are pivotally connected to the seat support extensions 23 formed from outer portions 32 of upper horizontal members 18 and 20. Seat support members 48 are preferably supported such that downward pivotal movement of seat 46 is limited to provide a substantially horizontal extended position, such as shown in FIGS. 1 and 2.

FIGS. 5 and 6 show the seat support members in 48 in greater detail. Each seat support is advantageously made from an L-shaped or C-shaped member. Seat suports 48 are shown with L-shaped members having a first or side leg 52 and a second or top leg 54. The side leg or legs 52 extend sufficiently far to provide side apertures for pivot pins 56. Pivot pins 56 are preferably bolts provided with double nuts so that the pivot can be adjustably tightened and held in the desired tightened condition.

The top legs 54 are shorter in length at the pivot end of seat support members 48 thus allowing the seat supports to be pivoted upwardly into upstanding positions as shown in FIG. 5. The location of pivots 56 is spaced inwardly from the distal ends of seat extensions 23 by more than the length of the notched inner ends of members 48. This provides an overlapping of the top leg 54 upon the upper surface of seat extensions 23. The overlap portions spaced from the pivots provide moment arms for resisting the bending moments applied by the cantilevered loading of seat 46.

FIG. 7 shows an alternative preferred seat mounting construction. Seat support members 148 are provided with apertures therethrough for receiving pivot bolts 156. The seat support members are entirely positioned laterally to the seat support extensions 23.

Tree stand 10 also includes means for securing the stand to tree 12 Such securing means preferably includes a flexbile tree girthing structure which is extendible about the tree and can be connected and disconnected from the stationary framework 11. FIG. 5 shows a chain 58 which is connected to stationary framework 11 via a closed loop 60 at one side and a downwardly open catch 62 at the other side. Other means for detachably mounting chains, cables, belts and other flexible tree girthing structures will be apparent to those of skill in the art.

The chain or other flexible tree girth 58 is preferably connected to stationary framework 11 in a construction which allows both upper and lower tree-engaging projections 19 to dig into the tree bark and provide resistance to downward motion. It has been found that by spacing the girth connection means 60 and 62 approximately 6 inches (15 cm) below the top and 20 inches (51 cm) from the bottom that a particularly effective mounting is possible. Downward shifting of the stand in the mounting process described below causes chain 58 to tighten the framework 11 against the tree with approximately balanced loading on the upper and lower projections 19. The vertical positioning of the chain connections has been found to have a substantial effect. If connected too high, then weight is carried by the lower projections 19b and it becomes difficult to extract them from the tree bark. If the girth is connected too low, loading is concentrated at the upper tree-engaging projections 19a. The specific geometry and construction of stands according to this invention will necessarily affect the dimensional specifications used.

Tree stands according to this invention are advantageously used by positioning the stand at a desired elevation upon the side of a tree with the tree engaging extensions engaging the bark and the longitudinal member or subframe extending the length of the tree, as shown in FIG. 1. The tree girthing or other securement means is then arranged around the tree, such as by extending chain 58 about the tree and passing a link onto catch 62. The user then extends platform 40 and mounts the stand. The stand is then set into the tree by bouncing once or twice in a sharp motion, with the user's weight as near to the tree as convenient. The positioning of the chain connection as explained above causes the bouncing or impact weight of the user to produce approximately even reactions at the upper and lower tree-engaging projections 19a and 19b, thus digging the angled projection tips into the tree bark to a desired degree. The embedded projections further support the weight of the stand and provide noise-free use.

Tree stands according to the invention are made by welding or otherwise fabricating steel, aluminum or other suitable material into the structural and functional elements or their equivalents as described herein.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A tree stand for supporting hunters, photographers and the like at elevated positions upon a tree trunk, comprising:

a stationary framework having:

at least one longitudinal member;

a plurality of tree-engaging extensions; said tree-engaging extensions projecting transversely from the longitudinal member in a treeward direction sufficiently far so as to space the longitudinal member substantially free from the tree and carry forces applied by the stand against the tree;

at least one seat mounting extension rigidly connected to the longitudinal member and extending transversely therefrom in an outward direction opposite to said treeward direction;

at least one seat mounting extension and tree-engaging extension being made from a single piece transversely connected to the longitudinal member;

at least one platform mounting extension rigidly connected to the longitudinal member and extending transversely therefrom in an outward direction opposite to said treeward direction; and further comprising:

seat means pivotally connected to said seat mounting extension for pivotal motion between extended and retracted positions;

platform means pivotally connected to said platform mounting extension for pivotal motion about a platform pivot spaced from said longitudinal member;

platform support means for supporting the platform means in at least one extended position; and tree girthing means detachably connectable to the stationary framework at upper portions thereof.

2. A tree stand for supporting hunters, photographers and the like at elevated positions upon a tree trunk, comprising:

a stationary framework having:

at least one longitudinal member;

a plurality of tree-engaging extensions; said tree-engaging extensions projecting transversely from the longitudinal member in a treeward direction sufficiently far so as to space the longitudinal member substantially free from the tree and carry forces applied by the stand against the tree;

at least one seat mounting extension rigidly connected to the longitudinal member and extending transversely therefrom in an outward direction opposite to said treeward direction;

at least one platform mounting extension rigidly connected to the longitudinal member and extending transversely therefrom in an outward direction opposite to said treeward direction;

the stationary framework including at least one I-shaped member forming tree-engaging projections, a platform mounting extension, and a seat mounting extension; and further comprising:

seat means pivotally connected to said seat mounting extension for pivotal motion between extended and retracted positions;

platform means pivotally connected to said platform mounting extension for pivotal motion about a platform pivot spaced from said longitudinal member;

platform support means for supporting the platform means in at least one extended position; and tree girthing means detachably connectable to the stationary framework at upper portions thereof.

3. A tree stand for supporting hunters, photographers and the like at elevated positions upon a tree trunk, comprising:

a stationary framework having:

at least one longitudinal member;

a plurality of tree-engaging extensions; said tree-engaging extensions projecting transversely from the longitudinal member in a treeward direction sufficiently far so as to space the longitudinal member substantially free from the tree and carry forces applied by the stand against the tree;

at least one seat mounting extension rigidly connected to the longitudinal member and extending transversely therefrom in an outward direction opposite to said treeward direction;

at least one platform mounting extension rigidly connected to the longitudinal member and extending transversely therefrom in an outward direction opposite to said treeward direction; and further comprising:

seat means pivotally connected to said seat mounting extension for pivotal motion between extended and retracted positions;

platform means pivotally connected to said platform mounting extension for pivotal motion about a platform pivot spaced from said longitudinal member;

platform support means for supporting the platform means in at least one extended position;

tree girthing means detachably connectable to the stationary framework at upper portions thereof;

there being at least two substantially parallel longitudinal members rigidly interconnected;

there being at least four tree-engaging transverse projections spaced longitudinally and laterally to said stationary framework; said tfree engaging transverse projections being integral with at least two seat mounting extensions and at least two platform mounting extensions; and the platform means being pivotal into a retracted position wherein the platform is overcenter and leaning into the longitudinal member to gravity bias the platform means into the retracted position.

4. The tree stand of claim 3 wherein the seat means can be pivoted into a retracted position wherein the seat means is overcenter and leaning treewardly to gravity bias the seat means into the retracted position.

5. A tree stand for supporting a hunter, photographer, or the like at an elevated position upon a tree trunk, comprising:

a generally I-shaped framework having an upper portion and a lower portion, the upper portion including at least one upper substantially horizontal elongate member, the lower portion including at least one lower substantially horizontal elongate member, the framework further having at least one substantially vertical elongate member, the vertical elongate member extending between the at least one upper and lower substantially horizontal elongate members, the upper and lower substantially horizontal elongate members having first and second portions which extend from the substantially vertical elongate member in respective, generally opposite, first and second directions, the first portions being adapted to engage a tree trunk;

a generally planar platform pivotally connected to the lower portion of the framework;

first support means for limiting the downward pivotal movement of the platform to an operative, substantially horizontal position;

seat means pivotally connected to the upper portion of the framework;

second support means for limiting the downward pivotal movement of the seat to an operative, substantially horizontal, position; and securing means for securing the framework to a tree trunk.

6. The tree stand of claim 5 wherein the first portion of the at least one upper substantially horizontal elongate member comprises at least one upper engagement tip for engaging a tree trunk, and the first portion of the at least one lower substantially horizontal elongate member comprises at least one lower engagement tip for engaging a tree trunk.

7. The tree stand of claim 5 wherein the securing means includes a flexible girthing member for surrounding a tree trunk, and attachment means for detachably securing the flexible girthing member to the at least one substantially vertical elongate member.

8. The tree stand of claim 5 wherein the first support means comprises at least one flexible platform suspension member extending from the at least one substantially vertical elongate member to the platform.

9. The tree stand of claim 7 wherein the first support means comprises at least one flexible platform suspension member extending from the at least one substantially vertical elongated member to the platform.

10. The tree stand of claim 9 including the at least one flexible platform suspension member being connected to the at least one substantially vertical elongate member at a connection location, the connection location being at a higher position on the at least one substantially vertical elongate member than the attachment means.

11. The tree stand of claim 5 wherein the seat is pivotally connected to the second portion of the at least one upper substantially horizontal elongate member.

12. The tree stand of claim 5 wherein the platform is pivotally connected to the second portion of the at least one lower substantially horizontal elongate member at a pivot location, the pivot location being spaced outwardly from the at least one substantially vertical elongate member a sufficient distance for enabling the platform to lean against the at least one substantially vertical elongate member when the platform is pivoted upwardly into a retracted position.

13. The tree stand of claim 12 wherein the platform is sized to be upwardly pivotal to an uppermost location which is beneath the pivotally connected seat whereby the platform and seat are each pivotal between extended and retracted positions regardless of the position of the other.

14. A tree stand for supporting a hunter, photographer, outdoorsman, or the like at an elevated position upon a tree trunk, the tree stand comprising:
a generally I-shaped stationary framework having a pair of interconnected I-shaped members, each I-shaped member including an upper transverse member, a lower tranverse member, and a longitudinal member; the longitudinal member extending between the upper and lower transverse members; the upper and lower trnasverse members each having first and second portions which extend from the longitudinal member in generally opposite, first and second directions, respectively; the first portions of the upper transverse members comprising a pair of upper tree-engaging projections; the first portions of the lower transverse members comprising a pair of lower tree-engaging projections; the upper and lower tree-engaging projections being adapted to engage a tree trunk for spacing the longitudinal members away from a tree trunk;
a generally planar platform pivotally connected to the second portions of the two lower transverse members of the pair of I-shaped members;
first and second platform suspension members, the first platform suspension member extending from one of the I-shaped members to the platform, the second platform suspension member extending from the other of the I-shaped members to the platform, for limiting the downward pivotal movement of the platform to a substantially horizontal extended position;
seat means;
a pair of seat support members connected to the seat, each seat support mebmer being pivotally connected to one of the second portions of the upper transverse members of the I-shaped members, whereby the seat means is pivotal with respect to the second portions of the upper transverse members; and
a tree girthing member connectable to the stationary framework for surrounding a tree trunk.

15. The tree stand of claim 14 wherein the platform is pivotally connected to the second portions of the two lower transverse members at a pair of pivot locations, the pivot locations being spaced outwardly from the longitudinal members a sufficient distance for enabling the platform to lean into and be gravity biased against the longitudinal members when the platform is pivoted upwardly into a retracted position.

16. The tree stand of claim 15 wherein the platform is sized to be upwardly pivotal to an uppermost location which is beneath the seat means whereby the platform and seat are each pivotal between retracted and extended positions regradless of the position of the other.

17. A tree stand for supporting hunters, photographers and the like at elevated positions upon a tree trunk, comprising:
a stationary framework having:
at least one longitudinal member;
tree-engaging extensions connected at spaced upper and lower positions along the longitudinal member; said tree-engaging extensions projecting transversely from the longitudinal member in a treeward direction sufficiently far so as to space the longitudinal member substantially free from the tree and carry forces applied by the stand against the tree;
said tree engaging extensions also forming seat mounting and platform mounting extensions;
and further comprising:
seat means pivotally connected to said stationary framework for pivotal motion between extended and retracted positions;
platform means pivotally connected to said stationary framework for pivotal motion between extended and retracted positions;
platform support means for supporting the platform means in at least one extended position; and
tree girthing means detachably connectable to the stationary framework; said tree girthing means being connected to the stationary framework at positions which are longitudinally between the tree-engaging extensions to provide an approximately balanced loading between upper and lower tree-engaging extensions.

18. A tree stand for supporting hunters, photographers and the like at elevated positions upon a tree trunk, comprising:
a stationary framework having:
at least one longitudinal member;
tree-engaging extensions connected at spaced upper and lower positions along the longitudinal member; said tree-engaging extensions projecting transversely from the longitudinal member in a treeward direction sufficiently far so as to space the longitudinal member substantially free from the tree and carry forces applied by the stand against the tree; and further comprising:
seat means pivotally connected to said stationary framework for pivotal motion between extended and retracted positions;
platform means pivotally connected to said stationary framework for pivotal motion between and retracted positions;
platform support means for supporting the platform means in at least one extended position; said platform support means comprising at least one flexible platform support member extending about the longitudinal frame above a horizontally extending strut to hold one end of the flexible platform support member at a predetermined longitudinal position along the longitudinal member; said flexible platform support member also extending about a platform framework spaced outwardly from a transverse platform brace on the platform means to hold the platform means in at least one extended position; and tree girthing means detachably connectable to the stationary framework.

19. The tree stand of claim 18 wherein there are at least two longitudinal members with at least one horizontally extending strut connected thereto; and there are two flexible platform support members extending from longitudinal members to opposite sides of the platform means.

* * * * *